United States Patent
Syme et al.

(10) Patent No.: US 9,880,860 B2
(45) Date of Patent: Jan. 30, 2018

(54) AUTOMATIC RETURN TO SYNCHRONIZATION CONTEXT FOR ASYNCHRONOUS COMPUTATIONS

(75) Inventors: Donald Syme, Grantchester (GB); Lucas James Hoban, Seattle, WA (US); Dmitry Lomov, Redmond, WA (US); Timothy Yat Tim Ng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1005 days.

(21) Appl. No.: 12/773,857

(22) Filed: May 5, 2010

(65) Prior Publication Data

US 2011/0276983 A1    Nov. 10, 2011

(51) Int. Cl.
| | |
|---|---|
| *G06F 9/44* | (2006.01) |
| *G06F 9/46* | (2006.01) |
| *G06F 9/54* | (2006.01) |

(52) U.S. Cl.
CPC ............ *G06F 9/4443* (2013.01); *G06F 9/461* (2013.01); *G06F 9/54* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 5,410,698 A * | 4/1995 | Danneels ............ | G06F 9/44521 348/E5.002 |
| 5,590,332 A * | 12/1996 | Baker ........................... | 717/151 |
| 5,893,159 A * | 4/1999 | Schneider ............. | G06F 9/5016 711/143 |
| 6,374,402 B1 * | 4/2002 | Schmeidler ............. | G06F 21/10 348/E5.008 |
| 6,611,877 B2 * | 8/2003 | Korn et al. .................... | 719/318 |
| 6,658,490 B1 * | 12/2003 | Williams et al. ............. | 719/330 |
| 6,779,180 B1 * | 8/2004 | Palm ..................... | G06F 9/4425 712/E9.082 |
| 7,458,072 B2 | 11/2008 | Moorthy et al. | |
| 7,546,606 B2 * | 6/2009 | Upton ........................... | 719/318 |
| 7,631,316 B2 | 12/2009 | Stall | |
| 7,634,514 B2 * | 12/2009 | Langan et al. | |
| 7,685,083 B2 * | 3/2010 | Fairweather ............ | G06F 8/427 706/45 |

(Continued)

OTHER PUBLICATIONS

WCF "Callbacks and Synchronization Contexts", Nov. 2015, pp. 1-3.*

(Continued)

*Primary Examiner* — H S Sough
*Assistant Examiner* — Phuong N Hoang
(74) *Attorney, Agent, or Firm* — Dicke, Billig & Czaja, PLLC (57) ABSTRACT

Architecture that includes an asynchronous library which remembers the synchronization context that initiated an asynchronous method call and when the request is completed, the library restores the synchronization context of the calling thread before executing a callback. This ensures that the callback executes on the same thread as the original asynchronous request. The callback to the asynchronous operation that asynchronous library provides automatically "jumps threads" to maintain thread affinity.

19 Claims, 8 Drawing Sheets

(56) References Cited

U.S. PATENT DOCUMENTS

| | | | | |
|---|---|---|---|---|
| 8,595,687 | B2* | 11/2013 | Yoshida | G06F 17/24 717/105 |
| 8,739,176 | B1* | 5/2014 | Darling | G06F 9/4818 718/103 |
| 2002/0194377 | A1* | 12/2002 | Doolittle et al. | 709/246 |
| 2003/0084097 | A1* | 5/2003 | Messinger et al. | 709/203 |
| 2003/0093471 | A1* | 5/2003 | Upton | 709/203 |
| 2005/0234936 | A1* | 10/2005 | Castro et al. | 707/100 |
| 2006/0136921 | A1* | 6/2006 | Becker et al. | 718/100 |
| 2008/0082965 | A1 | 4/2008 | Atkin et al. | |
| 2011/0088019 | A1* | 4/2011 | Jedlicka et al. | 717/143 |

OTHER PUBLICATIONS

Generation 5, "Keeping Track of State in Asynchronous Callbacks", Jun. 2, 2008, 7 pages.*

Mikeperetz, (Understanding SynchorizationContext (Part I), Jan. 9, 2009, pp. 1-17 17 [retrieved from https://www.codeproject.com/Articles/31971/Understanding-SynchronizationContext-Part-I].*

Microsoft, "Microsoft Computer Dictionary", Fifth Edition, ISBN 0735614954, 2012, pp. 1, 33, 182, and 309.*

Mikeperetz, ("Understanding SynchorizationContext: Part II"), Dec. 29, 2008, pp. 1-12 [retrieved from https://www.codeproject.com/Articles/32113/Understanding-SynchronizationContext-Part-II].*

Schenker, ("Synchronizing calls to the UI in a multi-threaded application"), Jan. 23, 2009, pp. 1-9 [retrieved from https://lostechies.com/gabrielschenker/2009/01/23/synchronizing-calls-to-the-ui-in-a-multi-threaded-application/].*

Haller, et al., "Implementing Joins using Extensible Pattern Matching", Retrieved at << http://soft.vub.ac.be/Publications/2007/vub-prog-tr-07-21.pdf >>, Tech Report, Lamp-Report-2007-004, Aug. 2007.

Houle, Paul., "Keeping Track of State in Asynchronous Callbacks", Retrieved at << http://gen5.info/q/2008/06/02/keeping-track-of-state-in-asynchronous-callbacks/ >>, Jun. 2, 2008.

"Serviceware Downloads", Retrieved at << http://www.idesign.net/idesign/DesktopDefault.aspx?tabindex=5&tabid=11 >>, Retrieved Date: Jan. 29, 2010.

Petříček, et al., "AFAX: Rich Client/Server Web Applications in F#", Retrieved at << http://tomasp.net/fswebtools/files/fswebtoolkit-ml.pdf >>, 2009.

Syme, Don., "Async and Parallel Design Patterns in F#: Reporting Progress with Events", Retrieved at << http://blogs.msdn.com/dsyme/archive/2010/01/10/async-and-parallel-design-patterns-in-f-reporting-progress-with-events-plus-twitter-sample.aspx >>, Jan. 10, 2010.

* cited by examiner

AUTOMATIC RETURN TO SYNCHRONIZATION CONTEXT FOR ASYNCHRONOUS COMPUTATIONS

BACKGROUND

For many graphical user interface (UI) architectures the programming model requires that interactions with the UI controls be executed on the main (or UI) thread. Many asynchronous programming models execute the continuations (or callback functions) on an algorithmically or arbitrarily chosen thread amongst a pool of threads. This means that developers that wish to take advantage of asynchronous programming techniques must be careful to marshal any interactions with UI controls to the UI thread. This is oftentimes a source of bugs for programmers.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes an asynchronous library that remembers the synchronization context that initiated an asynchronous method call and when the request is completed, the library restores the synchronization context of the calling thread before executing a callback. This ensures that the callback executes on the same thread as the original asynchronous request. The callback to the asynchronous operation that asynchronous library provides automatically "jumps threads" to maintain thread affinity.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture includes a library representation of a synchronization context, as an object with at least a method (e.g., named "Post"), which accepts a function object with a method (e.g., named "Invoke"), and arranges for the subsequent execution of the Invoke method. For example, an implementation of a synchronization context may queue a request in a message queue containing the function object. When that message is de-queued and processed, the Invoke method on the function object is called. In other words, the architecture remembers the synchronization context that initiated an asynchronous method call, and also registers a callback that is executed when the request is completed. The library restores the synchronization context of the calling thread before executing the callback. This ensures that the callback executes via the same synchronization context as the original asynchronous request.

In one implementation, the F# programming language provides language integrated support for asynchronous processes via a combination of language features (asynchronous workflows) and a runtime library which handles the management of asynchronous requests and responses.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
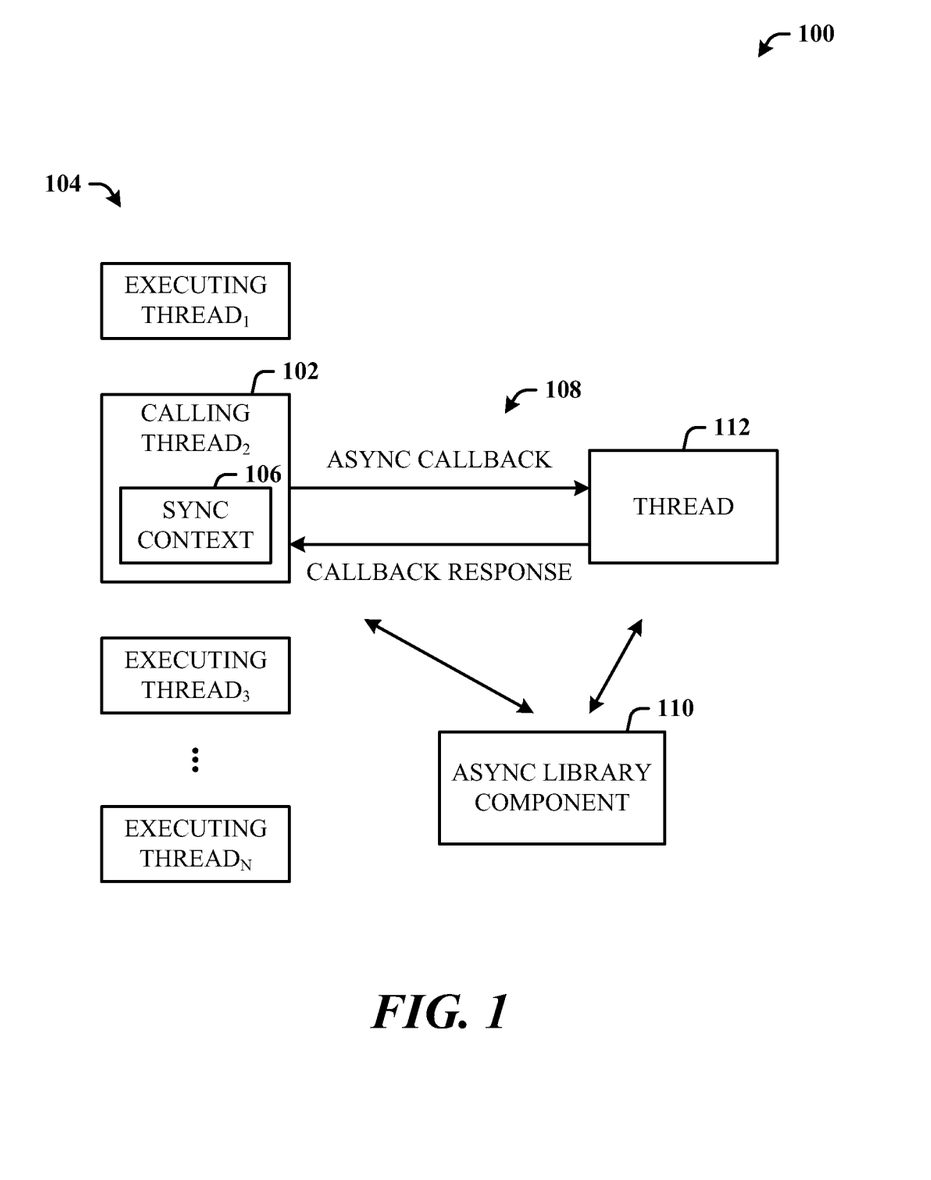
FIG. 1 illustrates a thread management system in accordance with the disclosed architecture.

FIG. 1 illustrates a thread management system 100 in accordance with the disclosed architecture. A calling thread 102 of multiple executing threads 104 has a synchronization context 106 from which an asynchronous callback 108 is requested. The system 100 includes an asynchronous library component 110 that tracks the requested asynchronous callback 108 as being made from the calling thread 102 and assigned to an algorithmically or arbitrarily chosen thread 112 from a thread pool. The asynchronous library component 110 restores the synchronization context 106 of the calling thread 102 before execution of the asynchronous callback 108 to the calling thread 102.

The calling thread 102 processes messages from a queue of user interface messages and the synchronization context 106 of the calling thread 104 executes a supplied callback 108 by adding an execution request to the queue. The user interface includes user interface objects that are accessed and updated from code running on the calling thread 102. The callback 108 is represented as an object value which is called by a library call of the library component 110 and specified using lambda syntax in a programming language. The calling thread 102 can include a workflow with additional points that indicate operations which create and combine asynchronous callbacks. The workflow is specified in a syntax translated by a compiler into calls. The synchronization context 106 includes an asynchronous computation that executes on the calling thread 102. The computation stores or calls the callback 108. The asynchronous callback 108 is combined with a function that generates further callbacks. A last callback returns an overall result to the synchronization context 106 of the calling thread 102.

In other words, the disclosed architecture includes a programming model where multiple threads of control may be executing concurrently. One thread can be a thread that processes messages derived from the user interface and the thread includes the ability to execute callbacks. User interface objects may only be accessed and updated from code running on the user interface thread. Callback functions are represented as object values which may be called using library calls and specified using lambda syntax in a source programming language.

Generators of asynchronous computations (called "asyncs") are represented as object values that can be created using library calls. An async can be run by specifying a callback, which initiates a computation on the current thread that may call or store the continuation function.

The architecture takes an object value and generates an async, which when run, calls its callback with that object value. The architecture can also combine an async with a function that generates further asyncs. The combined async executes the first async with a continuation, which when run, calls the function with the result. It then executes the second generated async, and calls the overall continuation of the async with the result of the second.

The architecture specifies a workflow using the syntax of an expression in the source language with additional points indicating operations that create and combine asyncs using the above mechanisms. A compiler translates this syntax into calls for the mechanisms.

The architecture constructs an async, which when started, initiates an I/O (input/output) request, for example, an HTTP GET web request. On completion of the request, if the async was originally started on the user interface thread, the callback is enqueued by posting a callback message to the user interface thread, which when run, calls the callback. If the async was originally started on a thread without synchronization context, the callback is executed on an arbitrary non-synchronization context (e.g., non-user interface) thread.

Note that a result of the model is that asynchronous workflows comprising only bind, return, and I/O requests that are started on the user interface thread, always have all user-specified evaluations executed on the user interface thread. Additionally, this is a multi-threaded system and that asyncs are "bi-modal" in that the asyncs can be started on either the user-interface thread or non-user-interface threads.

As previously indicated, one implementation of the disclosed architecture can be applied to the F# programming language. The F# solution is integrated with the F# language and library support for asynchronous work flows. The F# asynchronous workflow library captures the .NET synchronization context stored in the .NET storage location System.Threading.SynchronizationContext.Current when the initial asynchronous call is made. This context is stored in an internal representation along with the callback that the F# compiler generates (the callback represents the code to execute when the asynchronous method returns). The F# library registers a callback with the asynchronous method and when the callback executes, the library restores the synchronization context and executes the user's callback in the original synchronization context. Source programs do not explicitly need to describe the operation of switching back to the user interface thread or the original thread.

For example, consider the following asynchronous workflow in F#:

```
let a = async {
    [Do some work - call this Expression Block A]
    let! result = CallAnAsyncFunction( )
    [Do some work - call this Expression Block B]
}
```

The code in Expression Block A executes on a thread (e.g., the user interface thread). In existing solutions, however, the code in Expression Block B typically happens in a background thread pool thread. If user wants to make the code execute on the same thread as the thread that executed Expression Block A, the user has to manually remember the thread context before, and then establish the thread context later. This code can be tricky and cumbersome.

With this architecture, the F# compiler re-writes the above code and can generate the following example function:

```
let a = async.Delay(
    fun ( ) -> [Expression Block A]
    Async.Bind(f, fun result -> [Expression Block B])
)
```

The function "f" is passed to Bind:

```
let f cont =
    let ctx = Thread.CurrentContext
    CallAnAsyncFunction(
        fun args -> ctx.Post(fun ( ) -> cont args)
    )
```

The function "f" is passed in a callback (which is a function wrapping Expression Block B, generated by the F# compiler). Since "f" is executed on the original thread, "f" captures the current synchronization context. Next, "f" calls the async function that the user specifies, passing the called async function another function. In this case, the function is a lambda expression that restores the original thread synchronization context and then executes the callback. This ensures that the callback (denoted "cont") is executed on the same context as "f", thereby ensuring that the code the user wrote as part of Expression Block B is executed in the same context as the thread calling the asynchronous function.

This code generation is performed by the F# compiler, and it interacts with the asynchronous functions defined in the F# library to ensure that the synchronization contexts are correct.

Figure 2:
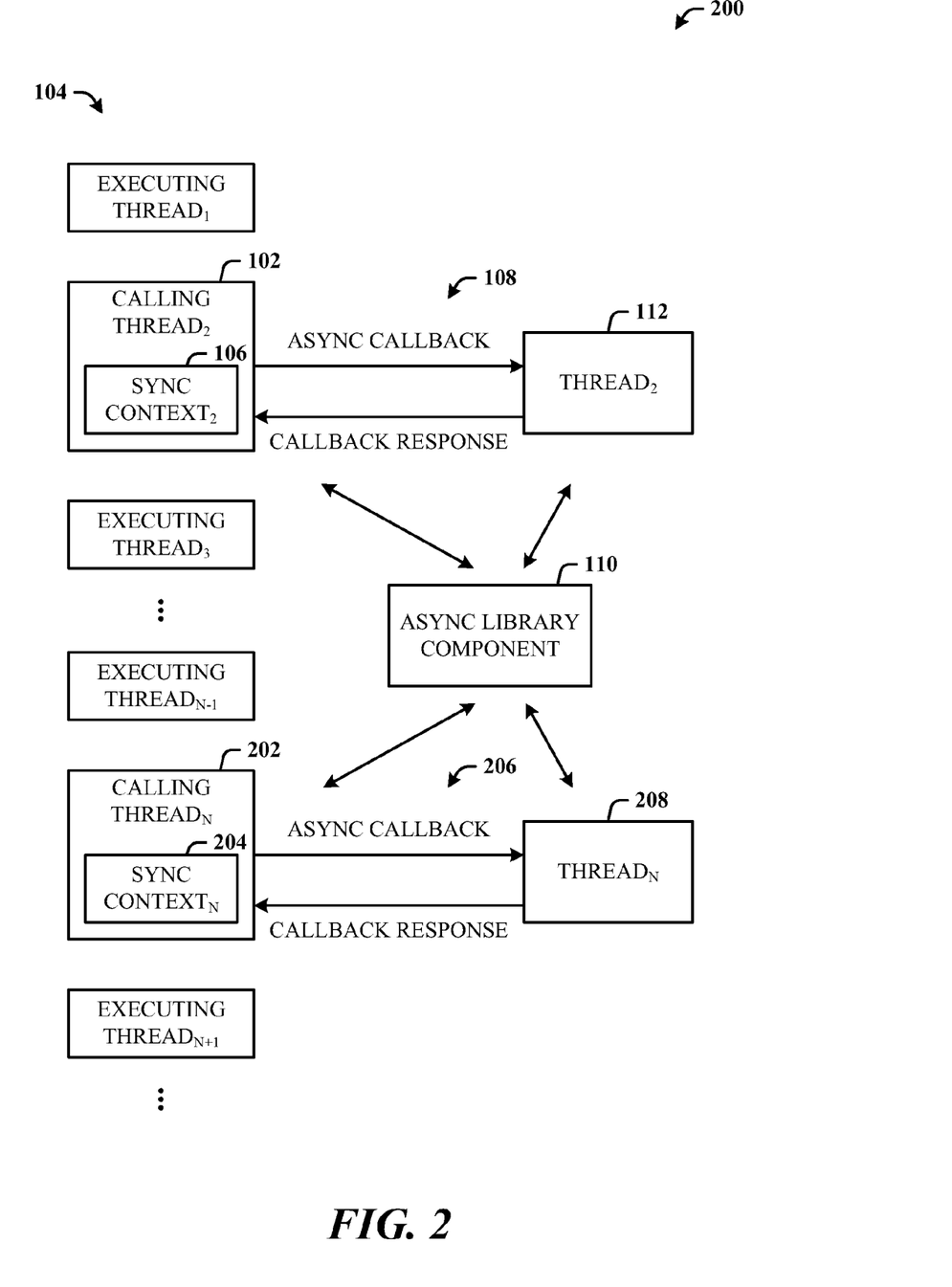
FIG. 2 illustrates a thread management system for concurrent thread processing where multiple callbacks are tracked and restored in corresponding synchronization contexts.

FIG. 2 illustrates a thread management system 200 for concurrent thread processing where multiple callbacks are tracked and restored in corresponding synchronization contexts. Here, the asynchronous library component 110 not only tracks the callback 108 and restores the associated synchronization context of the calling thread 102, but also for other threads, such as a second calling thread 202 of the multiple executing threads 104. The second calling thread 202 has a synchronization context 204 from which an asynchronous callback 206 is requested. The asynchronous library component 110 tracks the requested asynchronous callback 206 as well, being made from the second calling thread 202 and assigned to a second algorithmically or arbitrarily chosen thread 208 from a thread pool. The asynchronous library component 110 restores the synchronization context 204 of the second calling thread 202 before execution of the asynchronous callback 206 to the second calling thread 202.

It is to be appreciated that the asynchronous library component 110 can also provide the tracking and restore capabilities, as well as the other capabilities described herein, for multiple asynchronous callbacks of corresponding synchronization contexts of the same calling thread.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
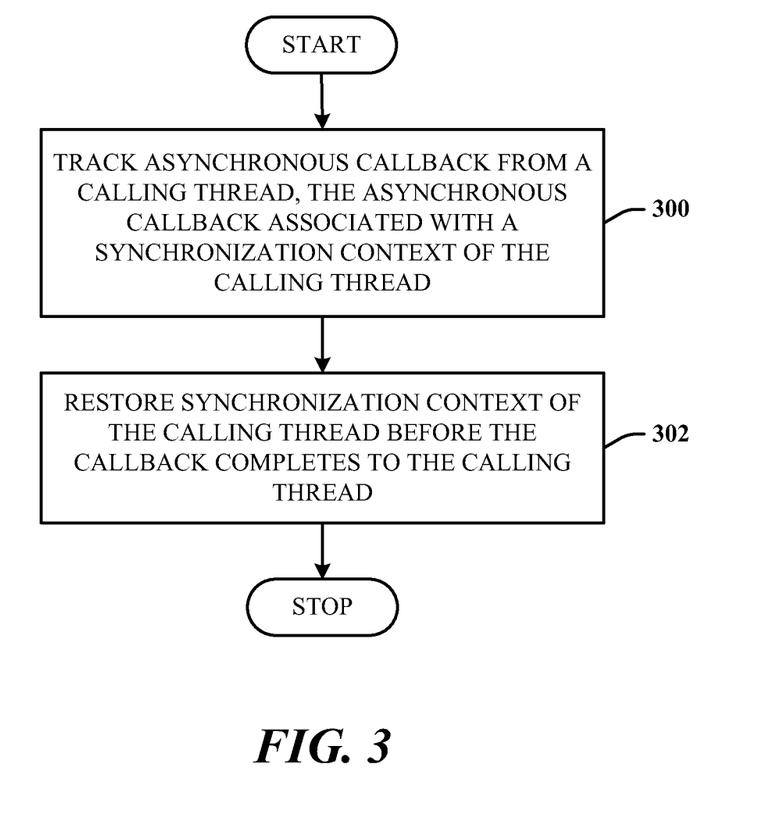
FIG. 3 illustrates a thread management method in accordance with the disclosed architecture.

FIG. 3 illustrates a thread management method in accordance with the disclosed architecture. At 300, an asynchronous callback is tracked from a calling thread. The asynchronous callback is associated with a synchronization context of the calling thread. At 302, the synchronization context of the calling thread is restored before the callback completes to the calling thread.

Figure 4:
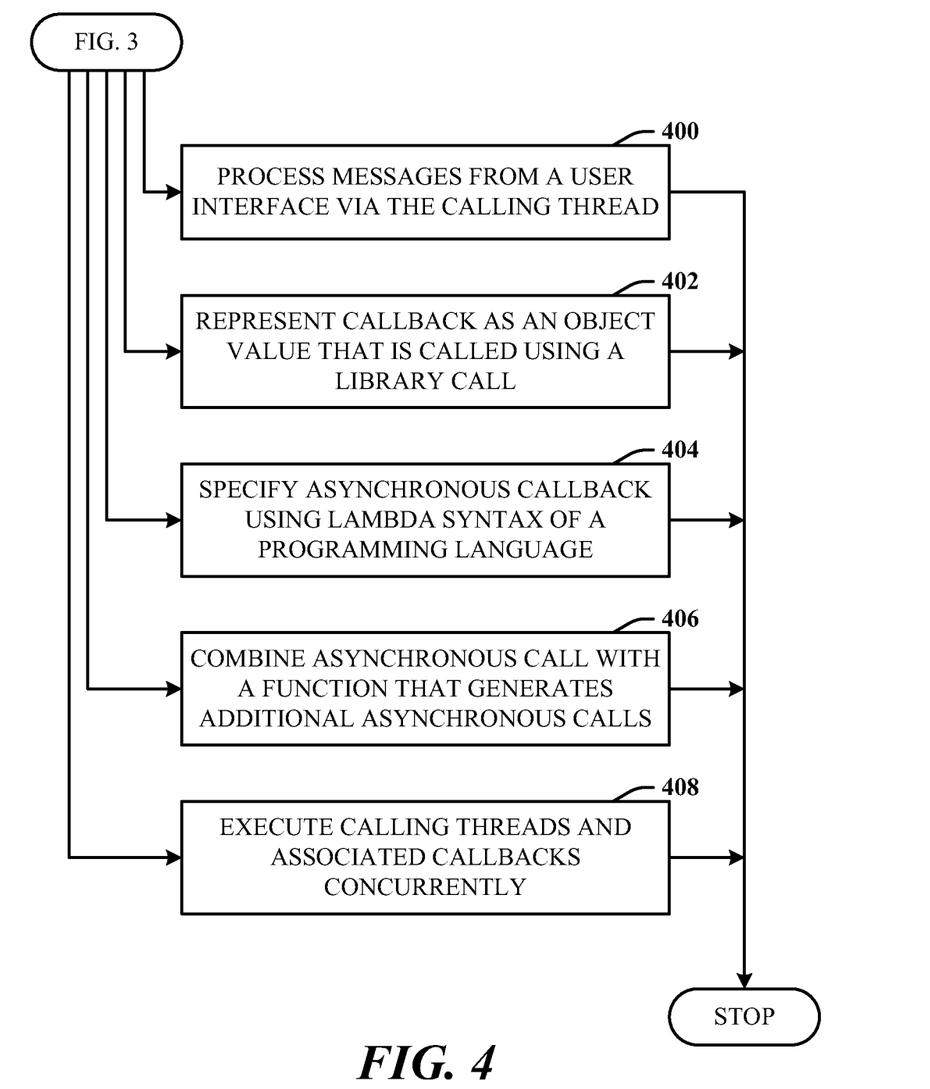
FIG. 4 illustrates further aspects of the method of FIG. 3.

FIG. 4 illustrates further aspects of the method of FIG. 3. At 400 messages from a user interface are processed via the calling thread. At 402, the callback is represented as an object value that is called using a library call. At 404, the asynchronous callback is specified using lambda syntax of a programming language. At 406, the asynchronous call is combined with a function that generates additional asynchronous calls. At 408, calling threads and associated callbacks are executed concurrently.

Figure 5:
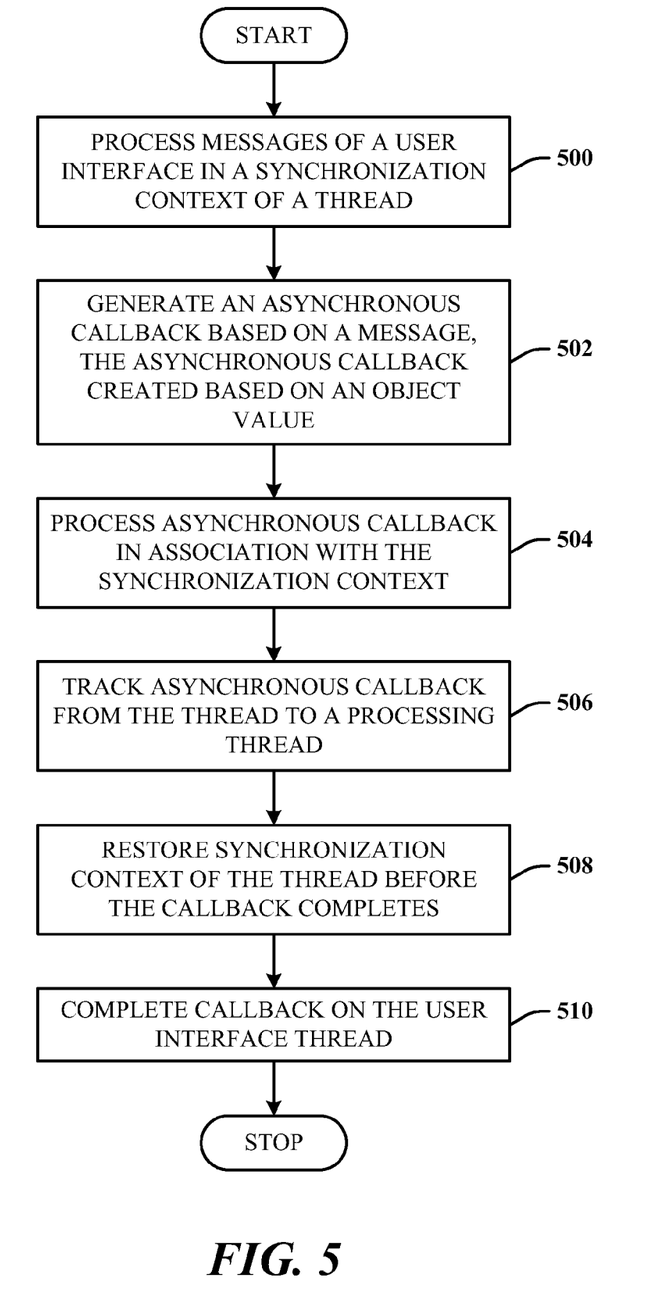
FIG. 5 illustrates an alternative thread management method.

FIG. 5 illustrates an alternative thread management method. At 500, messages of a user interface are processed in a synchronization context of a thread. At 502, an asynchronous callback is generated based on a message. The asynchronous callback is created based on an object value. At 504, the asynchronous callback is processed in association with the synchronization context. At 506, the asynchronous callback is tracked from the thread to a processing thread. At 508, the synchronization context of the thread is restored before the callback completes. At 510, the callback is completed on the user interface thread.

Figure 6:
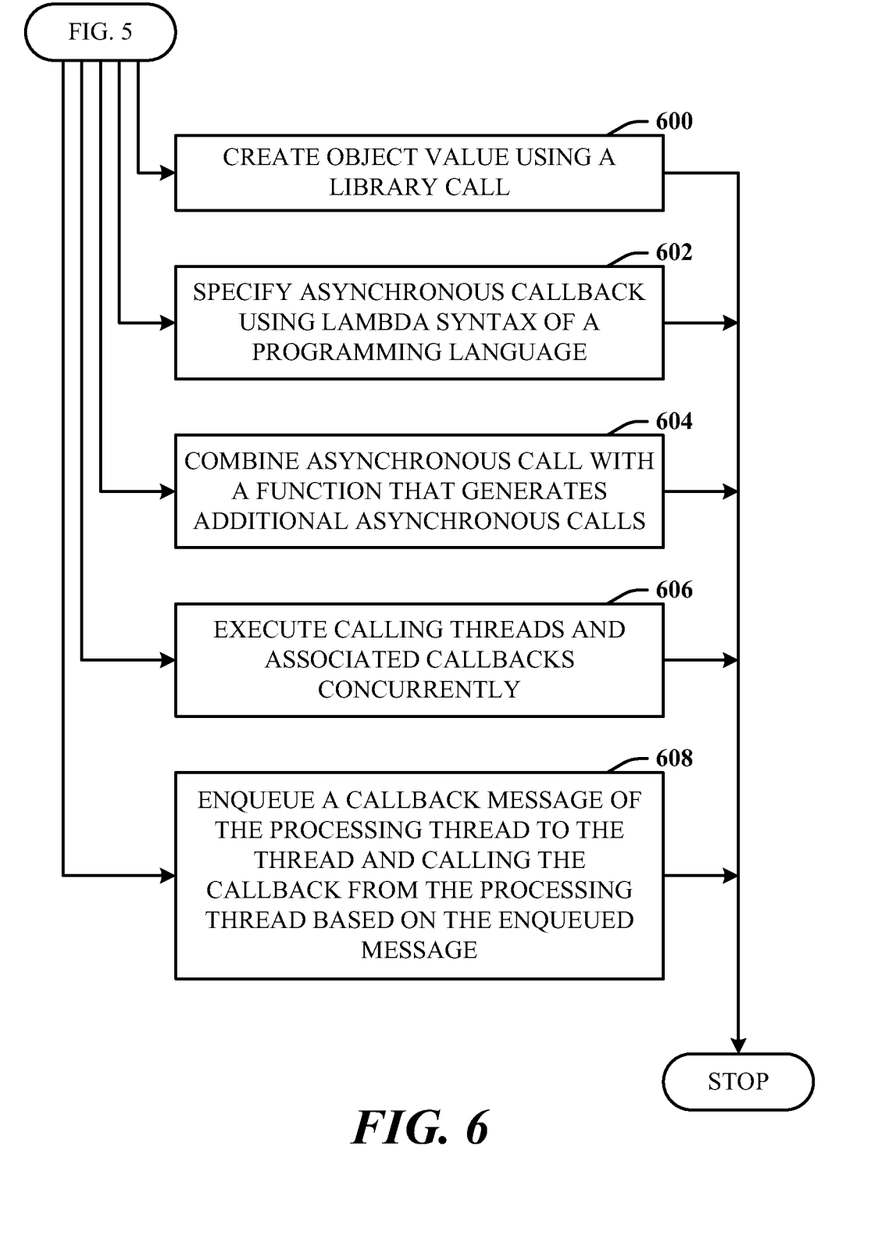
FIG. 6 illustrates further aspects of the method of FIG. 5.

FIG. 6 illustrates further aspects of the method of FIG. 5. At 600, the object value is created using a library call. At 602, the asynchronous callback is specified using lambda syntax of a programming language. At 604, the asynchronous call is combined with a function that generates additional asynchronous calls. At 606, calling threads and associated callbacks are executed concurrently. At 608, a callback message of the processing thread to the thread is enqueued and the callback is called from the processing thread based on the enqueued message.

Figure 7:
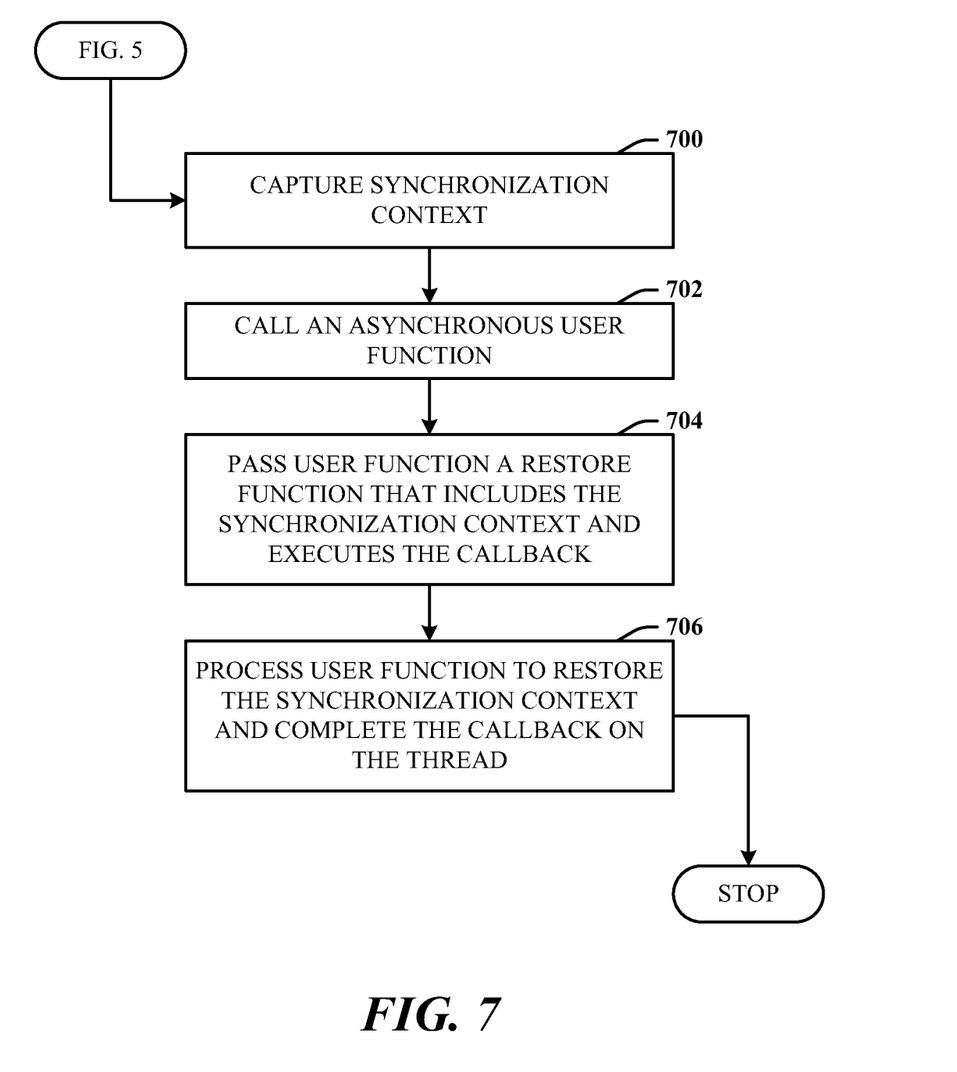
FIG. 7 illustrates additional aspects of the method of FIG. 5.

FIG. 7 illustrates additional aspects of the method of FIG. 5. At 700, the synchronization context is captured. At 702, an asynchronous user function is called. At 704, a restore function is passed to the user function that includes the synchronization context and executes the callback. At 706, the user function is processed to restore the synchronization context and complete the callback on the thread.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
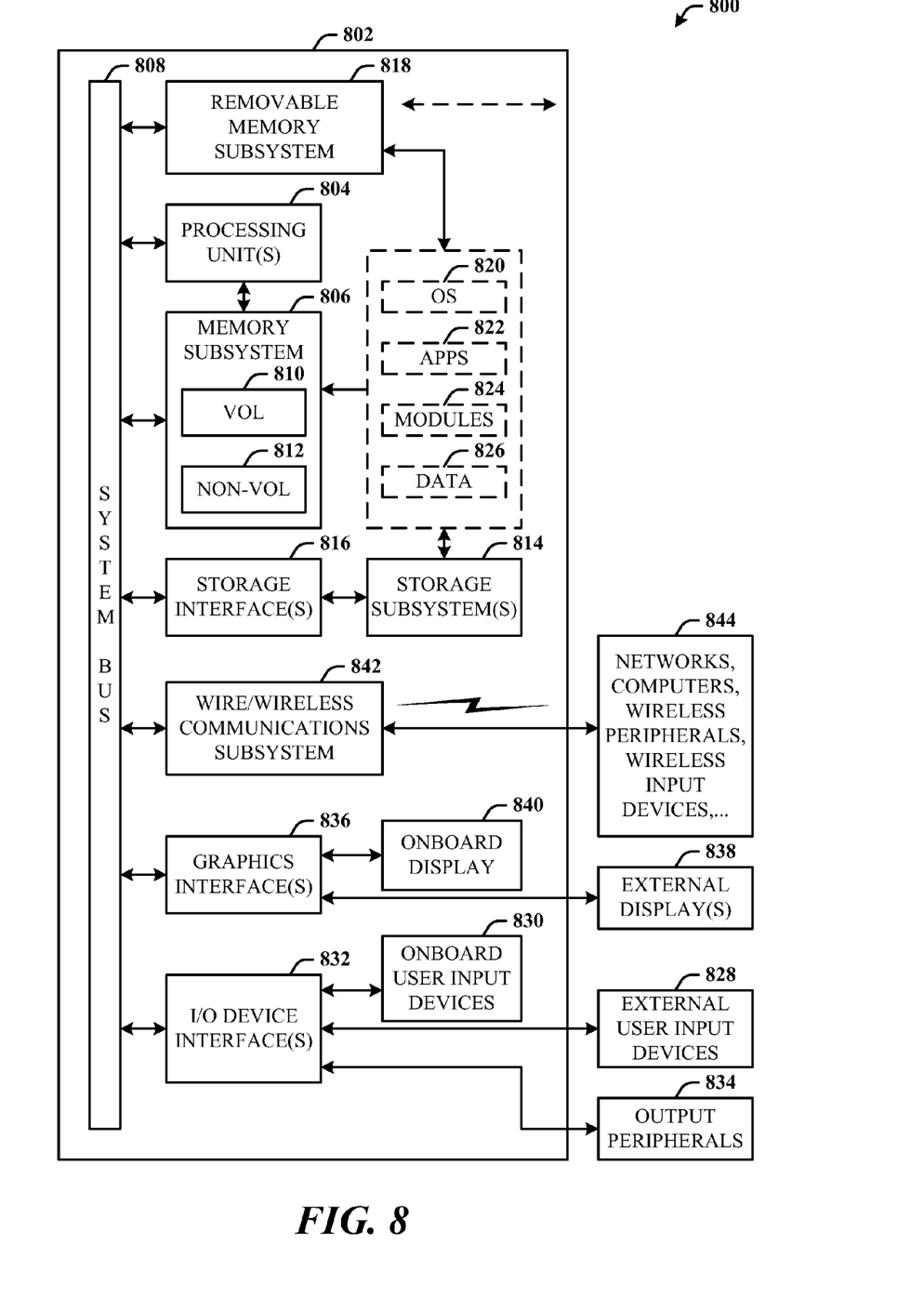
FIG. 8 illustrates a block diagram of a computing system that executes callback tracking and synchronization context restore in accordance with the disclosed architecture.

Referring now to FIG. 8, there is illustrated a block diagram of a computing system 800 that executes callback tracking and synchronization context restore in accordance with the disclosed architecture. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the entities and components of the system 100 of FIG. 1, the entities and components of the system 200 of FIG. 2, and the methods represented by the flowcharts of FIGS. 3-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented thread management system, comprising:
    a calling thread of multiple executing threads, the calling thread having a synchronization context from which an asynchronous callback is requested;
    an asynchronous library configured to track the requested asynchronous callback as being made from the calling thread and assigned to a thread from a thread pool, the asynchronous library includes a library representation of the synchronization context to capture the synchronization context, call an asynchronous function, pass a restore function to the asynchronous function that includes the synchronization context, process the asynchronous function to restore the synchronization context of the calling thread before execution of the asynchronous callback to the calling thread, and to ensure that the callback executes via the same synchronization context as the original asynchronous request; and
    a microprocessor configured to execute computer-executable instructions associated with at least one of the calling thread or the asynchronous library.

2. The system of claim 1, wherein the calling thread processes messages from a queue of a user interface and the synchronization context of the calling thread executes a supplied callback by adding an execution request to the queue.

3. The system of claim 2, wherein the user interface includes user interface objects that are accessed and updated from code running on the calling thread.

4. The system of claim 1, wherein the callback is represented as an object value which is called by a library call of the library and specified using lambda syntax in a programming language.

5. The system of claim 4, further comprising a workflow having workflow syntax in a programming language with additional points that indicate operations which create and combine asynchronous callbacks, the workflow specified in a syntax translated by a compiler into calls.

6. The system of claim 1, wherein the synchronization context includes an asynchronous computation that executes on the calling thread, the computation stores or calls the callback.

7. The system of claim 1, wherein the asynchronous callback is combined with a function that generates further callbacks, a last callback returns an overall result to the synchronization context of the calling thread.

8. A computer-implemented thread management method performed by a computer system executing machine-readable instructions, the method comprising acts of:
    initiating an asynchronous method call from a synchronization context of a calling thread of multiple executing threads;
    requesting an asynchronous callback from the asynchronous method call;
    tracking the asynchronous callback from the calling thread using an asynchronous library, which includes a library representation of the synchronization context; and
    restoring the synchronization context of the calling thread using the library representation of the synchronization context before the callback completes to the calling thread, to ensure that the callback executes via the same synchronization context as the original asynchronous request, including:
        capturing the synchronization context;
        calling an asynchronous function;
        passing a restore function to the asynchronous function that includes the synchronization context; and
        processing the asynchronous function to restore the synchronization context.

9. The method of claim 8, further comprising processing messages from a user interface via the calling thread.

10. The method of claim 8, further comprising representing the callback as an object value that is called using a library call.

11. The method of claim 8, further comprising specifying the asynchronous callback using lambda syntax of a programming language.

12. The method of claim 8, further comprising combining the asynchronous callback with a function that generates additional asynchronous calls.

13. The method of claim 8, further comprising executing calling threads and associated callbacks concurrently.

14. A computer-implemented thread management method performed by a computer system executing machine-readable instructions, the method comprising acts of:
    processing messages of a user interface in a synchronization context of a thread;
    generating an asynchronous callback based on a message, the asynchronous callback created based on an object value;
    processing the asynchronous callback in association with the synchronization context;
    tracking the asynchronous callback from the thread to a processing thread using an asynchronous library which includes a library representation of the synchronization context;
    restoring the synchronization context of the thread using the library representation of the synchronization context before the callback completes, to ensure that the callback executes via the same synchronization context as the original asynchronous request, including:
        capturing the synchronization context;
        calling an asynchronous function;
        passing a restore function to the asynchronous function that includes the synchronization context; and
        processing the asynchronous function to restore the synchronization context; and
    completing the callback on the user interface thread.

15. The method of claim 14, further comprising specifying the asynchronous callback using lambda syntax of a programming language.

16. The method of claim 14, further comprising combining the asynchronous callback with a function that generates additional asynchronous calls.

17. The method of claim 14, further comprising executing calling threads and associated callbacks concurrently.

18. The method of claim 14, further comprising enqueuing a callback message of the processing thread to the thread and calling the callback from the processing thread based on the enqueued message.

19. The method of claim 14, wherein the asynchronous function is an asynchronous user function, the method comprising:
    calling the asynchronous user function;
    passing the restore function to the asynchronous user function that includes the synchronization context and executes the callback; and processing the asynchronous user function to restore the synchronization context and complete the callback on the thread.

\* \* \* \* \*